United States Patent [19]

Kompelien

[11] 4,366,534
[45] Dec. 28, 1982

[54] ELECTRONIC CONDITION CONTROL SYSTEM USING DIGITAL ANTICIPATION

[75] Inventor: Arlon D. Kompelien, Richfield, Minn.

[73] Assignee: Honeywell, Inc., Minneapolis, Minn.

[21] Appl. No.: 173,512

[22] Filed: Jul. 30, 1980

[51] Int. Cl.³ .................... G05B 11/16; G05D 23/20
[52] U.S. Cl. .................. 364/183; 236/46 F; 235/92 CT; 307/117; 364/557
[58] Field of Search ............ 364/118, 557; 307/117; 318/596, 603; 219/492, 494; 236/46 F, 46 R, 91 R, 91 F, 91 D; 165/14, 26; 235/92 CC, 92 CT

[56] References Cited

U.S. PATENT DOCUMENTS

| 3,523,182 | 8/1970 | Phillips et al. | 307/117 X |
| 4,186,315 | 1/1980 | Benton | 307/117 |
| 4,196,356 | 4/1980 | Kabat | 307/117 |
| 4,270,693 | 6/1981 | Hayes | 307/117 X |

Primary Examiner—Joseph F. Ruggiero
Attorney, Agent, or Firm—Alfred N. Feldman

[57] ABSTRACT

A condition control system utilizing digital anticipation involving periodically filling a counter from a relatively high frequency source in response to a first frequency signal. The relatively high frequency signal is fed in a controlled manner into an anticipation cycle counting means to provide for digital anticipation in a condition control system. The system has been specifically disclosed as a temperature control system or thermostat. The system also provides for a bypass means to reset the system when a set point change has been made. A degulping circuit has been provided to eliminate instability at very high and very low loads.

17 Claims, 4 Drawing Figures

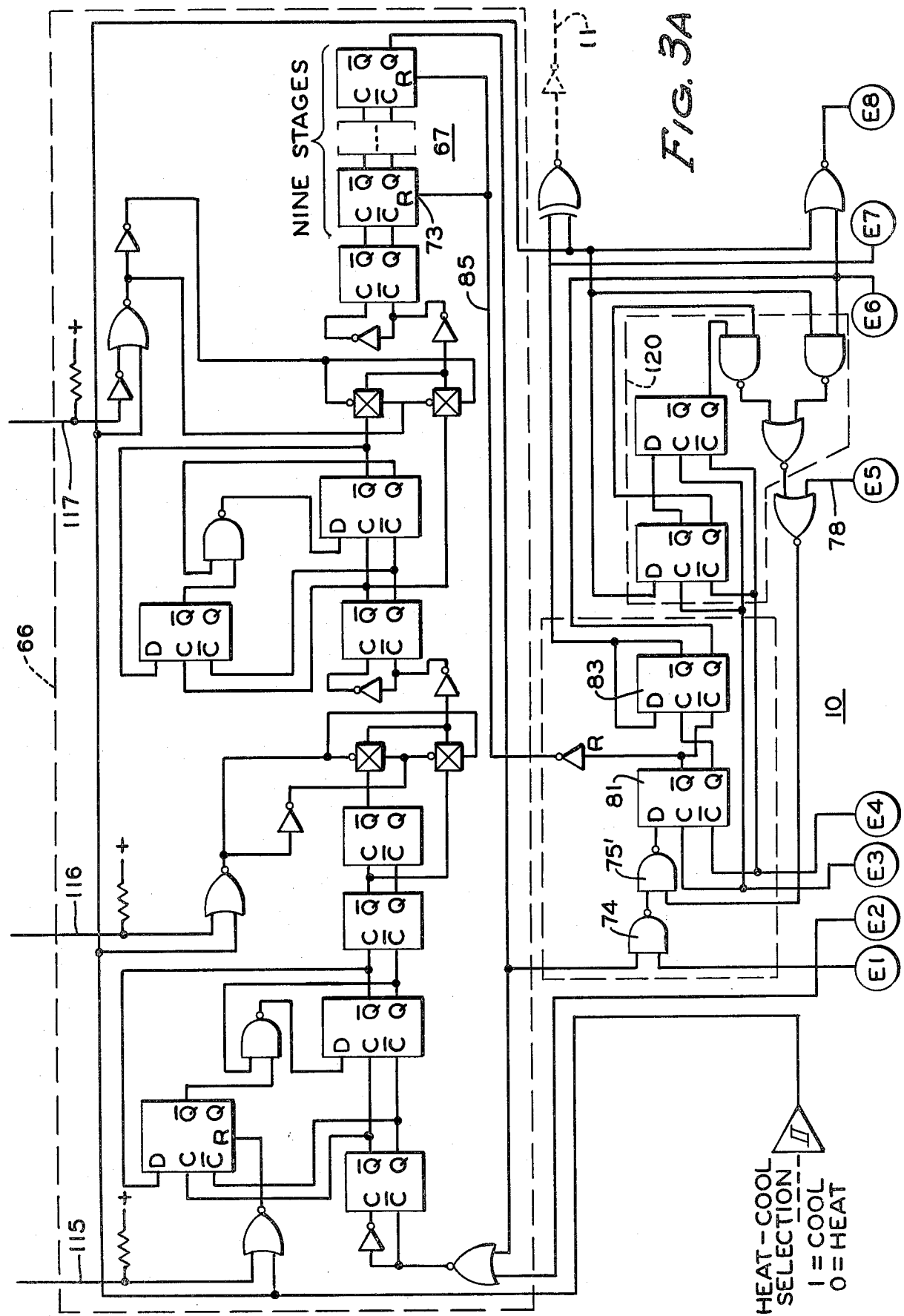

ELECTRONIC CONDITION CONTROL SYSTEM USING DIGITAL ANTICIPATION

BACKGROUND OF THE INVENTION

Control systems that are condition responsive are well known. One of the major applications of this type of condition responsive control system is in the control of heating and cooling equipment. The present invention is generally applicable to any type of condition control system that utilizes a condition responsive control, but will be generally described in terms of a thermostatically controlled system or thermostat.

A thermostat typically uses thermal anticipation to obtain a better system performance. This anticipation reduces the dependence on the ambient space temperature to actuate the thermostat between its "on" and "off" conditions. Various means are used to obtain the anticipation heat, but all of these are thermal and are, therefore, subject to the different air flows that exist in different installations. If the actual air flow over the thermostat in a particular application is greater or less than the air flow the thermostat was designed for, the actual temperature rise of the sensor due to the anticipator will be reduced or enhanced. This will result in less than optimum performance. A similar effect will occur if the air flow changes from time to time in a given installation. If the air flow is constant, the anticipator can be readjusted to bring back optimum performance, but in changing air flow conditions no one setting will be optimum. It should also be noted that in most thermostats, a change in the characteristics of the anticipator will also change the entire system droop.

In an electronic thermostat, anticipation can be achieved electronically. This has the advantage of not being affected by air flow and thus eliminates all of the problems associated with thermal anticipation as noted above. One method of obtaining this type of anticipation is the use of a resistor and capacitor charge and discharge arrangement as part of the negative feedback of an electronic amplifier while using a fixed positive feedback. This type of electronic anticipation is injected as a negative feedback mode with a single order time constant. For proper system operation, this time constant may need to be in the order of sixteen minutes. To obtain this type of a time constant with a single resistor-capacitor arrangement requires high resistances and a very low leakage, large capacitor. The size of the resistors and capacitor would place a burden on the cost of the device, and on the physical size of the thermostat itself, making electronic anticipation obtained in this fashion impractical for many thermostatic applications.

In the U.S. Pat. No. 4,196,356 to Kabat and the U.S. Pat. No. 4,186,315 to Benton, a prior art condition responsive time proportional control means has been specifically disclosed. The time proportional circuit utilizes a relatively small capacitor and resistors having a rapid cycling rate. This rapid cycle controls a counter that forms part of a counting means. The counter, in one simple form, is a ripple counter. The cycling action of the time proportional control means is combined with a pulse generating means so that the time constant of the overall control system can be multiplied by the pulse rate of the pulse generating means without changing the system droop (the temperature cycling band).

In the previously mentioned prior art types of condition responsive time proportional control means, a problem has arisen in the application of the control system under certain operating conditions. It has been found in the prior art devices that the integrating action of the counter can cause an undesirable cycling of the load. Under load conditions of approximately ten to ninety percent of full load for the system, the prior art devices work quite well. In the very light load conditions and the very heavy load conditions, the counter integrating action can disrupt the operation of the system when normal cycling room temperature swings go outside of the proportional band. This disruption occurs in that a longer than normal time delay is required to load the counter once the room temperature swings back into the proportional band, and the overall system performance is less than desirable. This action has been referred to as a "gulping" action. This was corrected in the Benton patent by providing the counting means with two separate counting channels. The correction of this action has been referred as a "degulping" of the system.

SUMMARY OF THE INVENTION

The prior art condition control systems as described in the Kabat and Benton patents lead to the development of a commercially successful thermostat. This type of thermostat, while being a fully satisfactory type of unit from an operational point of view, was more expensive than desirable. The complexity of the circuitry has lead to the present invention.

The present condition control system, which will be described and discussed specifically as a temperature control system, utilizes a condition responsive or temperature responsive impedance in the form of a resistor. The resistor acts to effect the balance of a bridge network which in turn is sensed by a comparator means or amplifier. In order to accomplish the necessary anticipation function, the bridge is regularly altered in its balance state by the application of a first frequency signal from a frequency source means within the device. This constant application of a first frequency signal to the bridge causes the output of the comparator amplifier to regularly alternate within a designed range. The alterations are supplied to digital logic means and are combined with timing functions to cause the opening or closing of a gating circuit to an anticipation cycle counting means. The anticipation cycle counting means is simultaneously driven by a relatively high frequency so that when the gating means is open, the counting means stores counts. The proportion of counts stored to the number of counts blocked depends on the state of balance of the bridge and is repetitively provided to the anticipation cycle counting means by the action of the first frequency signal on the bridge means. This arrangement allows the anticipation cycle counter to count up the necessary cycles to act as an anticipation means in the same sense as the prior art devices. Once the anticipation cycle counting means is filled, it switches the output of the system and the counter is reset to zero. The action then starts again on the reverse acting cycle of the system.

The present arrangement, by the application of some simplified digital logic allows for overcoming the gulping action and in the present application that circuitry will be generally referred to as a degulping circuit or degulping means. This term has been coined in connection with this type of art as the action was unknown prior to the discovery as disclosed in the Benton patent. Also, the present digital circuitry allows for an immediate recognition of a change in the set point of the control device thereby allowing a rapid change in the output state when a sudden change in the set point has been entered. In the prior art of electronic counter controllers, this type of action was overcome by electromechanical means coupled to the set point mechanism and that function added substantial expense.

The present invention also provides, from the frequency source means, various signals that can be used for clock operated thermostat functions. The clock operated thermostat functions are not part of the present invention, but the simple implementation in the present invention lays the ground work for providing the clock mechanism that can be used for other control purposes than in the condition control portion of the system.

The present invention disclosure will show a simplified functional type of block diagram of the present invention, and then will disclose the details of the specifics of one implementation of the invention.

BRIEF DESCRIPTION OF THE DRAWINGS

FIG. 3A and FIG. 3B disclose the detailed digital implementation of the condition control portion of a clock operated thermostat.

DESCRIPTION OF THE PREFERRED EMBODIMENT

Figure 1:
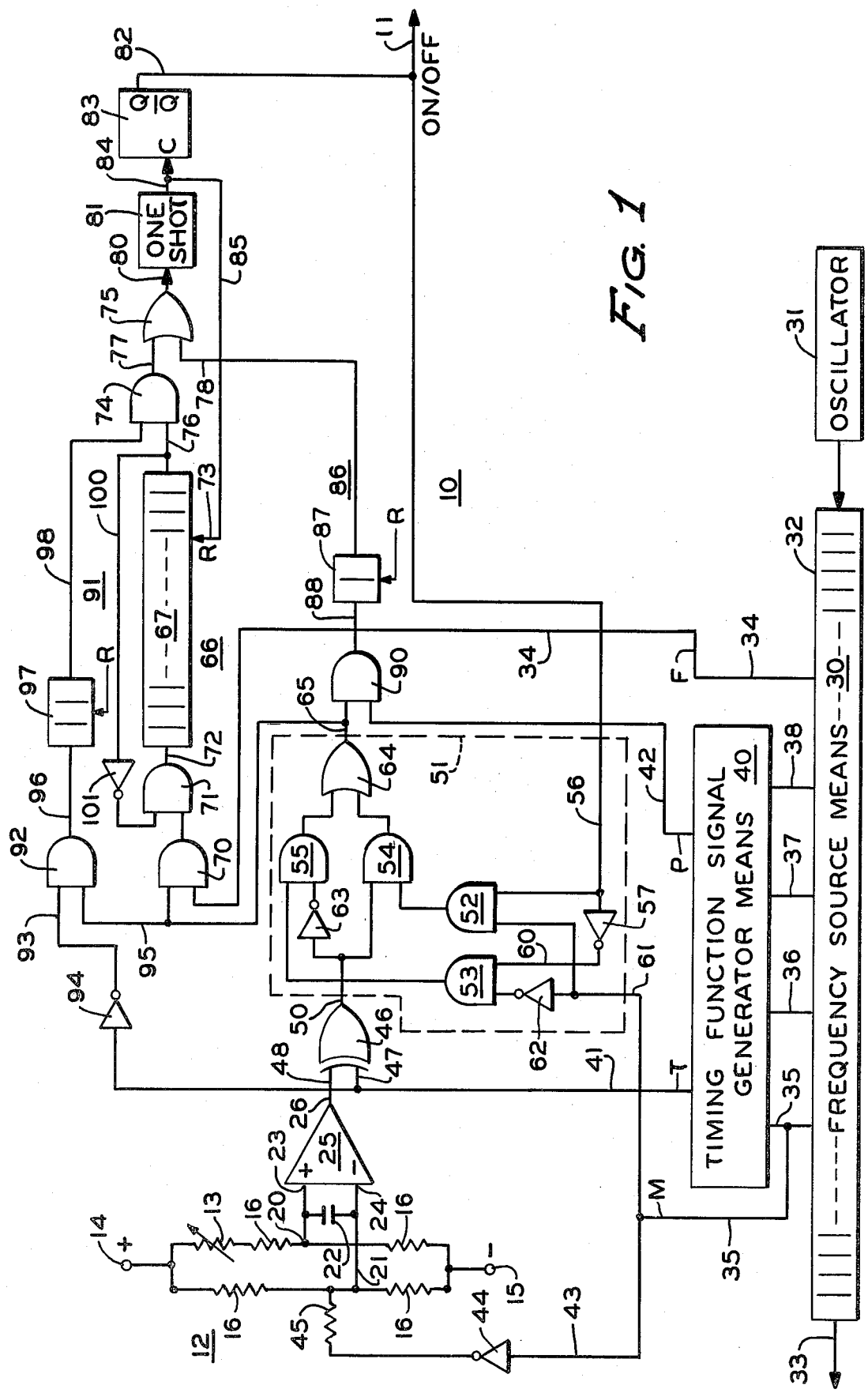
FIG. 1 is a functional block diagram of the condition control portion of an electronic clock type thermostat.
Figure 3B:
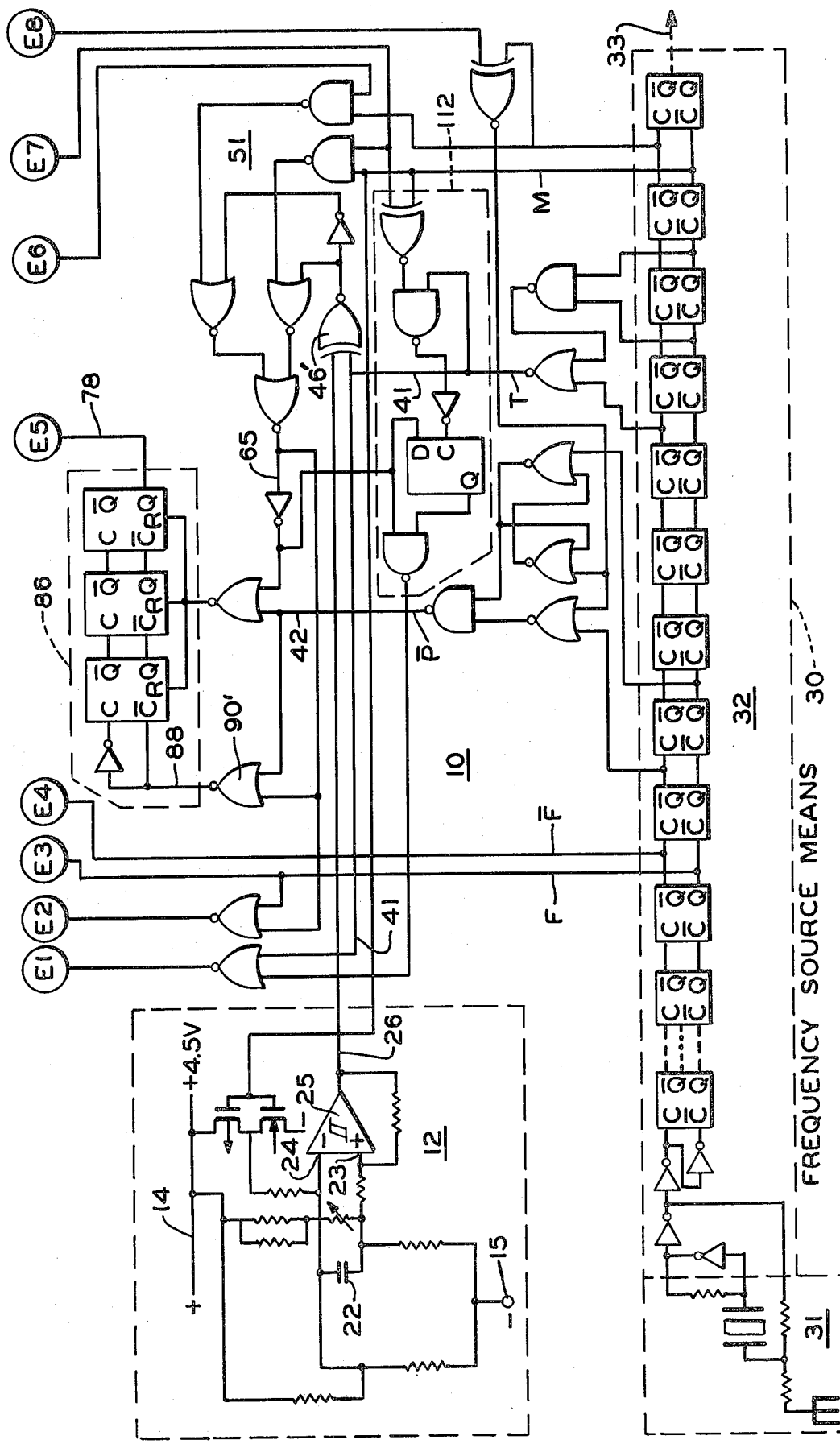

A functional type of block diagram of the electronic condition control system utilizing a form of digital anticipation is shown in FIG. 1. The functional diagram is provided as a means of disclosing and explaining the invention and is not intended as a limitation or a disclosure of the best mode for implementing the digital logic. FIGS. 3A and 3B disclose an actual implementation of the invention and when FIGS. 3A and 3B are discussed correspondence in function will be noted against the disclosure of FIG. 1.

In FIG. 1 the condition control system is generally disclosed at 10 and will be specifically described as a temperature control system or thermostat. It should be understood that any type of condition can be responded to by this type of a condition control system as long as the condition responsive element or sensor is compatible, and such compatible sensors are well known in condition control applications. The condition control system 10 has an output 11 that is switched between an "on" and an "off" state. This output could drive a furnace and/or air conditioning compressor for residential comfort control.

The condition control system utilizes a bridge means 12 that has a condition responsive element 13 in the form of a condition responsive impedance means or a temperature responsive resistance. The bridge means 12 is supplied with power in a conventional fashion at terminals 14 and 15 as is the balance of the digital logic. The power supply for the condition control system and the digital logic is not specifically disclosed and is well known in the art. The bridge means 12 further has a plurality of other resistances 16 to complete the bridge. One of the resistances 16 can be made variable and would act as a set point for the condition control system as is conventional in the thermostat or temperature control art.

The bridge means 12 has a pair of output conductors 20 and 21 that form output means and are connected to a capacitor 22 that forms part of the input means 23 and 24 for a comparator means 25. The comparator means 25 has an output at 26 and the comparator means 25 is a comparator type of amplifier with appropriate feedback circuits so that the output at 26 is either "on" or "off" to form a digital 1 or a digital 0 for the balance of the digital logic involved in the condition control system 10.

The condition control system 10 is supplied with a frequency source means generally disclosed at 30 which includes a high frequency oscillator 31 and a number of dividing stages 32 so that the frequency source means 30 can count down the oscillations from the oscillator 31 to supply a plurality of different frequencies and signals that are used in the overall condition control system. Frequency source means 30 can be any basic frequency source and could even be derived from the 60 hertz line frequency. An output of the frequency source means is at 33 and can be in the order of one cycle per day. Other signals from frequency source means 30 are used in a clock operated temperature control system to which the present condition control system 10 would be applicable. The overall time operated temperature control aspects are not disclosed as they are not part of the present invention, but could be similar to a number of prior art digital timing arrangements for the time controlled operation of a thermostat. The output 33 has been shown merely to provide one example of the application of part of the overall temperature control system 10.

The frequency source means 30 has a number of progressively lower frequency signal outputs for use in the present invention. The first output from the frequency source means 30 is on a conductor 34, and in a preferred embodiment is at a frequency of approximately 256 hertz. This frequency has been arbitrarily designated as the "F" frequency and is a relatively high frequency signal compared to the final output frequency "M" on conductor 35. The first frequency signal or M frequency signal on conductor 35 would be in the order of one hertz. The frequencies M and F play a significant part in the present invention and the application to the balance of this circuitry will be explained in detail later. It is only important at this point to understand that a first relatively low frequency signal M is supplied along with a further or relatively high frequency signal F.

The balance of the outputs from the frequency source means 30 are disclosed on conductors 36, 37, and 38 which are connected to a timing function signal generator means generally disclosed at 40. The timing function signal generator means 40 provides two additional signals for use in the condition control system 10. The first signal is on conductor 41 and has been designated as the "T" pulse. The other output from the timing function signal generator means 40 is the "P" pulse on conductor 42. The first frequency signal M, the relatively high frequency signal F, the timing pulse T, and the timing pulse P are all critically interrelated and their relationship is generated by the design of the digital logic contained in the frequency source means 30 and the timing function signal generator means 40. Their relationship is shown in the graph of voltage versus time in FIG. 2. The nature of these signals and their interrelationship will be discussed in more detail after the balance of the circuit of FIG. 1 is disclosed.

The first frequency signal M on conductor 35 is fed to a further conductor 43, a NOT gate 44 and a resistor 45 where the signal is connected at the lead 21 within the bridge means 12. The first frequency signal M is a square wave that occurs at the one hertz frequency, and the voltage is applied to the bridge means 12 so as to repetitively cycle the output of the bridge in a manner that will be further described in connection with FIG. 2. This type of cycling causes the output 26 of the comparator means 25 to switch between a 1 and 0 in a time proportional balance depending upon the state of balance of the bridge means 12. The utilization of this function in the condition control system 10 will be brought out in connection with FIG. 2.

The first timing function signal T on conductor 41 is initially connected to a digital logic means 46 that has been disclosed as an Exclusive-OR gate having an input at 47. The other Exclusive-OR input 48 is connected to the output 26 of the comparator means 25. The digital logic means 46 has an output means 50 that is connected as one input to a further digital logic means generally disclosed at 51. The further digital logic means 51 really is made up of a number of AND, OR, and NOT gates and includes generally a pair of parallel but reciprocally controlled signal processing paths. After the makeup of the further digital logic means 51 is identified, these two generally parallel, but reciprocally controlled signal processing paths will be identified.

The further digital logic means 51 has four AND gates identified as 52, 53, 54, and 55. The AND gate 52 has an input means or conductor 56 that is connected directly to the AND gate 52, and further connected to a NOT gate 57. The NOT gate inverts the signal on the conductor 56 and supplies it as an input on conductor 60 to the AND gate 53. The AND gate 52 further has its other input connected to conductor 61 which is in turn connected to conductor 35 to receive the first frequency signal M. The conductor 61 connects through a NOT gate 62 and forms the second input for the AND gate 53. The conductors 56 and 61 form two of the inputs to the further digital logic means 51 and these signals are each inverted and supplied as different signals to the AND gates 52 and 53 thereby providing the inputs to the generally parallel but reciprocally controlled signal processing paths within the further digital logic means 51. The AND gates 52 and 53 are each connected as inputs to the further AND gates 54 and 55. The output 50 from the digital logic means 46 is supplied to each of the AND gates 54 and 55 with the signal to 55 passing through the NOT gate 63. This continues the generally parallel but reciprocal control signal processing paths. The output of the AND gates 54 and 55 are combined in an OR gate 64 that has an output conductor 65 that forms the output means for the further digital logic means 51.

The output means 65 of the further digital logic means 51 forms a primary input to a section of the device that is identified as an anticipation cycle counter means 66. The anticipation cycle counter means 66 includes a number of stages of digital counting that have been disclosed at 67 along with a pair of AND gates 70 and 71 that form part of the anticipation cycle counter means input gate means. The input gate means from the AND gates 70 and 71 is connected by conductor 72 to the counter 67 so that digital signals processed by the AND gates 70 and 71 are counted in the anticipation cycle counting means 66. The counter 67 contains a reset function disclosed at 73 so that the counter can be reset when an appropriate signal is provided. The anticipation cycle counter means 66 has an output gate means generally made up of an AND gate 74 and the following OR gate 75. The AND gate 74 is connected directly by conductor 76 to the output of the counter 67 while the OR gate 75 is connected by conductor 77 to the AND gate 74 as well as to a conductor 78 whose function will be described later. The anticipation cycle counter output gate means 74 and 75 are connected by a conductor 80 into a one shot 81 that in turn drives a bistable output means 82 by means of a digital element 83 that is connected with its clock input at a conductor 84. The conductor 84 also connects to conductor 85 for reset signals to the reset 73 of the counter 67. Each time the one shot 81 operates, the clock input C of element 83 reverses the output on conductor 82 so as to provide an "off-on," and then an "on-off" operation at the output 11 for the condition control system.

A counter bypass means is generally disclosed at 86 and includes an optional small count counter 87 that is connected at its output to the conductor 78 and at an input 88 to an AND gate 90. The AND gate 90 is controlled by the output 65 of the further digital logic means 51, and by the P pulse on conductor 42 to the AND gate 90. The counter 87 of the counter bypass means 86 is provided with a reset from the circuitry so that the counter means 86 can be reset when necessary. The counter 87 is not essential, but acts to filter out any spurious counts at the output 88 of the AND gate 90. Since the function of the counter bypass means 86 is to eliminate interference and noise signals so that they do not disrupt the operation of the device, but to allow a rapid alteration of the output state, it is desirable to use only a few counting stages. This will be explained later.

The condition control system 10 is completed by the addition of a circuit that is referred to as a degulping circuit or degulping logic means. This circuit is disclosed at 91 and includes an AND gate 92 that has as one input a conductor 93 that is connected through a NOT gate 94 to the T pulse on conductor 41. As an additional input to the AND gate 92 a conductor 95 connects the AND gate 92 to the output 65 of the further digital logic means 51. The AND gate 92 is connected by conductor 96 to a small counter 97 (an optional counter with reset provisions) that in turn connects to a conductor 98 that is connected into the AND gate 74. The counter 97 could be replaced with some form of digital delay logic, as is shown in FIG. 3B. The degulping logic means 91 functions to hold the control system 10 in a fixed state while allowing the counter 67 to be filled with counts, in a manner that will be described in detail in connection with the operation of the overall system. The system has a feedback circuit 100 from the output of the counters 67 through a NOT gate 101 to the input of the AND gate 71 in the anticipation cycle counter gate means 66. To complete the circuitry there is a conductor 34 which supplies the F frequency to the input of the AND gate 70.

Figure 2:
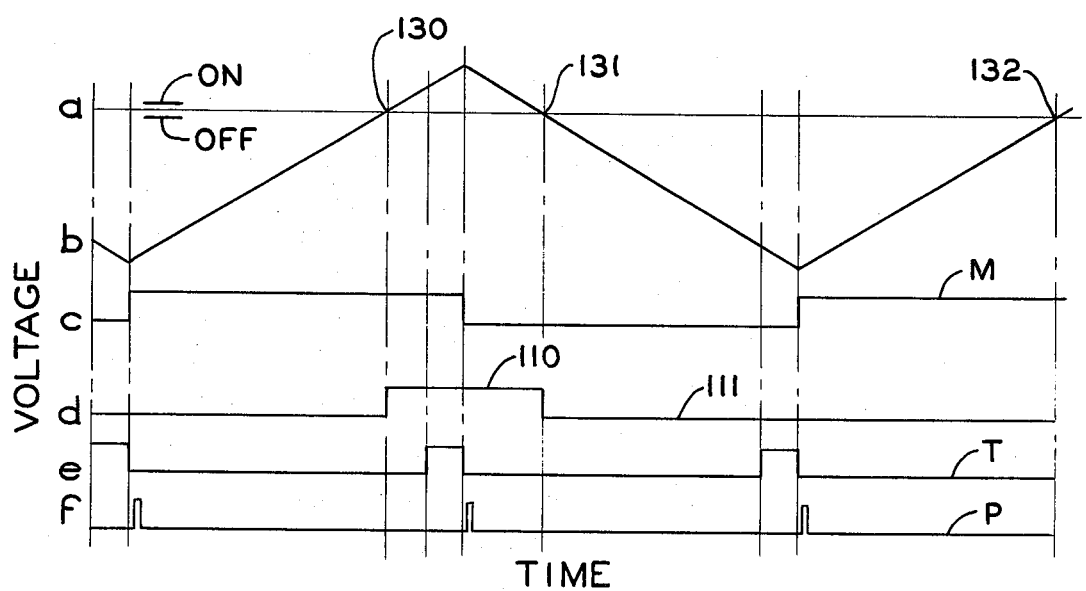
FIG. 2 is a group of curves of voltage versus time within the system disclosed in FIG. 1.

The interrelationship of the voltage and time functions of the various frequencies and timing signals will be discussed in connection with FIG. 2. In FIG. 2 six different voltages are shown in a timed relationship. The timing of the different voltages is critical to the operation of the present device and all of the frequencies and timing signals must be synchronized by the digital logic. In FIG. 2 the comparator differential input voltage curve 2(a) to the comparator 25 has been shown. It is represented generally as a single voltage, but in reality it is a very narrow voltage range with the comparator being in an "on" state at the slightly higher level and in an "off" state at a slightly lower level. The voltage curve 2(b) is a total modulation signal voltage that moves with respect to voltage 2(a) depending on the amount of unbalance of the bridge 12. Voltage 2(b) can be considered as being moveable with respect to voltage 2(a) over its entire range which would be between the zero and 100 percent ranges of control of the overall condition control system. In the event that the voltage 2(b) moved beyond the voltage level 2(a) the control system would be out of its normal control range, as would occur if a thermostat was suddenly set up or down from a temperature at which it had been controlling.

In FIG. 2 the curve 2(c) is a representation of the M frequency or the first frequency signal for the control system. It will be noted that the first frequency signal M corresponds in its total length or period with the curve 2(b) since curve 2(b) is generated as a result of the M frequency.

The curve of voltage shown in FIG. 2 is the resultant of the previous curves and shows the voltage output from the comparator at conductor 26. Curve 2(d) is generated at the intersections of curves 2(a) and 2(b).

The curves of voltages represented in FIGS. 2(e) and 2(f) are the timing signals T and P. It will be noted that the first timing signal T is a pulse which occurs during the last part of each half of the cycle or period of the first frequency signal M. The timing signal P is a very short duration pulse that occurs shortly after the beginning of each half cycle of the signal M. Each time the curve 2(c), 2(e) or 2(f) rises the signal is considered to be a logic 1. The balance of the time the signal is considered to be a logic 0. Also, the output of the comparator means 25 on conductor 26 that is shown as curve 2(d) also is a logic 1 on the rise and is a logic 0 when the signal falls.

The interrelationship of these various timed voltages is critical to the operation of the present device and their application will be described in connection with the operation of the overall condition control system 10.

OPERATION OF FIG. 1

The operation of the condition control system 10 can be best understood if it is initially assumed that the bridge means 12 is operating the system so that the temperature being controlled at the output 11 is close to the set point temperature of a bridge means 12. In that case, the voltage curves disclosed in FIG. 2 show a representative case. The bridge means 12 is being caused to generate the saw tooth voltage 2(b) which intersects the curve 2(a) at 130 and 131 and provides the comparator means 25 with an output at conductor 26 with a 1 for a period of time designated as 110 between 130 and 131. During the period of time 111, between 131 and 132, the output on conductor 26 is a 0. It can be seen that output 110 is substantially shorter. During the period 110 the output on conductor 26 provides a 1 to the Exclusive-OR gate 46 in FIG. 1. If it is assumed that the output of the condition control system 10 is "on" at 11, a 1 appears on conductor 56. At this same time the first frequency signal M supplies a 1 during part of the time on conductor 61. These three inputs can be followed through the further digital logic means 51 and it will be found that the output at 65 has a 1 for a period of time that corresponds to time period 110 of FIG. 2. During this same period of time the relatively high frequency signal F is being fed by conductor 34 as a signal to the AND gate 70. With AND gate 70 receiving both 1 signals, it allows the relatively high frequency signal F to pass through to where it also passes through the AND gate 71. The AND gate 71 has a 1 at its other gate due to the lack of an output from the counter 67 because of the reset condition from the previous cycle. Each time the AND gates 70 and 71 allow the relatively high frequency signal F to pass through into the counter 67, the count value increases. In the "off" state of output 11, the amount of time that the counter 67 fills is during time 111 (FIG. 2(d)) before T became a 1 or M became a 1. In the "on" state of output 11 the counter 66 fills during time 110 before T becomes a 1 and M becomes a 0. After sufficient counts fill the anticipation cycle counter means 66, the output at 76 changes to a 1 which in turn blocks the input to AND gate 71 and causes the one shot 81 to clock a signal through to the digital element 83 in the event the degulping circuit 91 recognizes these as normal cycling pulses which in turn changes the output state at 11 of the condition control system 10. This change in state at output 11, changes the processing channel within the further digital logic means 51 so that it is properly active to process counts from the relatively high frequency signal F into the anticipation cycle counter means 66.

The time period for which the condition control system 10 is either "on" or "off" at 11 is a function of the comparative lengths of the counting portions of the curves 110 and 111. The lengths of the counting portions vary as the curve 2(b) is raised or lowered with respect to the curve 2(a) which in turn is a function of the amount of unbalance of the bridge caused by the temperature sensing element 13. Under very high load conditions, that is when a system is operating in a very cold climate (for a heating load) the time portion 110 becomes very long with respect to the time portion 111. When the system is operating under a very light load (for a heating load) the portion of time 110 becomes very small with respect to the portion of time 111. As these proportions change the amount of time that the relatively high frequency signal F is fed into the counter means 66 is changed. It can thus be seen as the load changes on the system, the period of time taken for the anticipation changes, so by properly selecting the first frequency signal period M, the T signal time, the relatively high frequency signal F, and the length of the counter 67, a good match in the anticipation function of a control system can be accomplished.

The control system just described provides for the normal cycling of a condition control system 10 when the bridge means 12 is within the proportional band. There are occasions where a system is operating and someone suddenly changes the thermostat by turning the temperature up substantially (or down substantially). In either case, the sudden change in the set point at the bridge means 12 causes the entire signal of FIG. 2(b) to be moved either substantially above or substantially below the on-off value of 2(a). In either case, the counter bypass means 86 then comes into operation. This substantial change in the relationship of the curves 2(a) and 2(b) allows for the digital output of the control signal P to be fed through the AND gate 90 and into the counter 87. After a very short period of time (since counter 87 has only a few counting stages to eliminate any spurious system counts) an input is provided on conductor 78 to the OR gate 75 which immediately changes the state of the system. This will occur so that the long time interval that is embodied in the anticipation cycle counting means 66 can be bypassed so that a response to the sudden change in the set point of the thermostat occurs in a relatively short period of time. In a typical thermostatic control system the anticipation cycle might be as long as 12 or 16 minutes. If a set point change was made in a direction to change the state and the system did not respond for that long a time period, the system would perform unsatisfactorily in the eyes of the user. As such, the addition of the pulse P when fed through the AND gate 90 in conjunction with an appropriately timed control signal at the output of the further digital logic means 51 causes the counter bypass means 86 to function to change the state of the output 11 in a relatively short period of time thereby taking into account any set point changes at the input of the thermostat. While the system would work without this feature, as indicated before, the user would be dissatisfied as the system would not seem to respond rapidly enough to sudden changes. This is particularly important where night setback or day setup are provided in a heating and cooling type of application for the conservation of energy.

The last case that is important to the operation of the present system is the case where the system operates in a degulping mode. As was pointed out early in the present specification it has been found that with systems of this type operating at near 100 percent load, or at very light loads, the system did not respond satisfactorily. The previous degulping arrangements utilized auxiliary counters, but they were much more complex than the present arrangement. In the present arrangement a degulping logic means was provided at 91. The object of the degulping logic means 91 is to momentarily block the output of the normal anticipation cycle counter means 66 while allowing the cycle counter 67 to be filled with counts so that the system can respond promptly when the room temperature swings back into the normal cycling range. For instance, if the system was operating at a very light load, and due to room temperature swings the bridge means 12 swings outside the normal cycling range, the counter means 66, (if it were not for the degulping logic means 91) would have to wait an excessive time for the counter 67 to fill after the bridge signal returned to the normal cycling range. With the degulping logic means 91, the pulse T or timing signal T provides a signal through the degulping logic means 91 to block the counter means 66 from causing a change in the output 11 while simultaneously causing the input 50 of the further digital logic means 51 to allow the input means 70 and 71 of the anticipation cycle counting means 66 to receive a suitable number of fill counts from the relatively high frequency signal F. By allowing the high frequency signal counts F to be stored in the counter 67 while blocking its output, it is possible in the degulping mode to fill the counter means 66 and have it ready for operation as soon as the state of balance of the bridge means 12 changes. As soon as the balance changes, causing the output of logic means 51 to allow counts just prior to a T pulse for a small number of T pulse cycles, the degulping logic means 91 allows a change in state of the output 11 that is desired. This is provided by counter 97 receiving input pulses through AND gate 92.

In FIG. 3A and FIG. 3B there is presented an actual implementation of a preferred embodiment of the invention that was shown functionally in FIG. 1. Since the actual implementation shows all the digital components, and since they are in some cases only equivalent, only a general correspondence can be drawn between the FIGS. 1 and 3. Anyone skilled in the digital art can follow through the detailed disclosure of FIGS. 3A and 3B, and only portions of the circuit will be identified to show the correspondence to that of FIG. 1.

In FIG. 3B the frequency source means 30 is specifically disclosed as a crystal oscillator 31 feeding a series of dividing stages or counters 32 wherein the various frequencies, such as the first frequency signal M is disclosed as taken off near the output 33. The relatively high frequency signal F is disclosed as being taken off prior to the ninth digital logic element that counts down to the output of the frequency source means 30. In reality certain of the signals not only are taken off as shown schematically in FIG. 1, but their reciprocal value is also shown as being taken off to drive certain portions of the circuit. In FIG. 3B a degulping counting filter is disclosed at 112. This filter allows for the removal of stray pulses and is a form of digital delay logic that is equivalent to counter 97 in FIG. 1. The timing signal T is shown as taken off of the frequency source means 30, as is the timing pulse P. In this particular case the reciprocal of the timing pulse P or $\overline{P}$ is shown.

The bridge means 12 is shown with the conventional bridge elements and the comparator 25 having its output at 26. The output 26 is connected to the Exclusive-NOR gate 46' which in turn feeds into the further digital logic means generally disclosed at 51. These signals are fed into the counter bypass means shown at 86.

In FIG. 3A the upper portion of FIG. 1 is disclosed in detail. The anticipation cycle counting means is disclosed at 66 but it is disclosed as having three input control lines 115, 116, and 117. The three inputs 115, 116, and 117 are used to supply a number of different cycling rates. By the digital circuitry disclosed and the use of external switches (not shown) the conductors 115, 116, and 117 can be connected to provide different cycling rates which are useable with different types of installations. It does this by changing the number of pulses to fill the counter. With the three disclosed inputs it is possible to obtain values of 1, $1\frac{1}{2}$, 2, 3, $4\frac{1}{2}$, 6, and 9 cycles per hour for the anticipation cycle counting means 66. The system is also set up so that if the system is used for cooling that an automatic selection is made of three cycles per hour which is compatible with most refrigeration compressors. All of this material is pointed out merely to show the general structure of an actual device. In the anticipation cycle counting means 66 the specific counting elements 67 are again disclosed each connected by a conductor 85 to a reset signal from the output a D flip-flop 81, basically functioning as a one shot, which precedes the digital element 83. Also disclosed is a digital logic element 120 which is used to sense the power supplied to the unit when the unit is set for operation of cooling equipment. This section 120 provides logic such that when the system is powered up, the output 11 is arranged so that any cooling load is "off." This prevents cooling compressors from being cycled inadvertently due to power disruptions during storms or by somebody switching between the heating and cooling modes in a central heating and air conditioning system. While in the cool mode, the fast output change from "off" to "on" is disabled by limiting the P pulse through the E-8 signal path.

The system specifically disclosed in FIGS. 3A and 3B constitute a detailed embodiment in digital elements of the same portion of the system disclosed in FIG. 1. This detailed disclosure can be readily followed by anyone skilled in the digital art but has been highly simplified in FIG. 1 for convenience in disclosure of the operation of the system and definition of the specific novelty involved. As is apparent by the difference between the digital disclosure of FIG. 1, and FIGS. 3A and 3B, it is possible to implement the concept in many different ways. A person skilled in the digital art could provide many different combinations of digital elements to perform the novel function of the present invention. For that reason, the applicant wishes to be limited in the scope of his invention solely by the scope of the appended claims.

The embodiments of the invention in which an exclusive property or right is claimed are defined as follows:

1. An electronic condition control system using digital anticipation circuit means, including: frequency source means supplying a plurality of different frequency signals; timing function signal generator means connected to said frequency source means and generating a plurality of timing signals; bridge means including condition responsive impedance means; said bridge means being connected to a first of said frequency signals so that said bridge means has a repetitively cycling output signal at an output means; comparator means having an input connected to said bridge output means; said bridge output signal controlling said comparator means to provide a comparator means output signal; digital logic means connected to said comparator means output and to a first of said timing signals to provide a first digital control signal; anticipation cycle counter means capable of counting a plurality of digital pulses to establish an anticipation time for said condition control system; said anticipation cycle counter means having input gate means and output gate means; said output gate means connected to control bistable output means which establishes "on" and "off" states for said condition control system; further digital logic means connected to receive said first digital control signal, said first signal frequency, and the state of said bistable output means as control inputs; said further digital logic means having an output connected to said input gate means of said anticipation cycle counter means; and said frequency source means further having a relatively high frequency signal compared to said first frequency signal with said relatively high frequency signal connected to said anticipation cycle counter input gate means to cause said counter means to rapidly fill with counts when said counter input gate means is opened by the presence of a signal from said further digital logic means.

2. An electronic condition control system as described in claim 1 wherein the controlled condition is temperature, and said condition responsive impedance means includes a temperature responsive resistor.

3. An electronic condition control system as described in claim 2 wherein said frequency source means includes an oscillator and a plurality of counting stages to divide the frequency of said oscillator to supply said plurality of different frequency signals.

4. An electronic condition control system as described in claim 3 wherein said first frequency signal is in the order of one hertz and said relatively high frequency signal is at least in the order of a magnitude higher than said first frequency signal.

5. An electronic condition control system as described in claim 4 wherein said relatively high frequency signal is in the order of 256 hertz.

6. An electronic condition control system as described in claim 3 wherein said anticipation cycle counter means includes a plurality of counting stages connected to provide for counting of digital signals from said input gate means, and which stages include reset gate means to restore said counter means to its initial state upon receipt of a reset signal.

7. An electronic condition control system as described in claim 6 wherein said digital logic means includes an Exclusive-OR gate, and said further digital logic means includes a plurality of gate means forming a pair of generally parallel but reciprocally controlled signal processing paths.

8. An electronic condition control system as described in claim 7 wherein said timing function signal generator means generates a second of said timing signals; said second timing signal being of short duration and occurring after said first timing signal; and counter bypass means responsive to said timing signals and connected to said anticipation counter output means to change the state of said bistable output means upon the existence of a predetermined difference in the temperature relationship between said bridge means and the output state of said control system.

9. An electronic condition control system as described in claim 8 wherein said counter bypass means includes an AND gate and a delay counter; said delay counter acting to delay the action of said counter bypass means to prevent interference counts from changing the state of said control system.

10. An electronic condition control system as described in claim 9 wherein said delay counter includes reset means to periodically clear said delay counter.

11. An electronic condition control system as described in claim 10 wherein said first frequency signal is in the order of one hertz and said relatively high frequency signal is at least in the order of a magnitude higher than said first frequency signal.

12. An electronic condition control system as described in claim 11 wherein said relatively high frequency signal is in the order of 256 hertz.

13. An electronic condition control system as described in claim 3 which further includes degulping logic means having an output connected to said anticipation cycle counter output means; said degulping logic means having input gate means connected to said first timing signal and to the output of said further digital logic means; said degulping logic means acting to disable said anticipation counter means output while concurrently allowing said relatively high frequency means to fill said anticipation cycle counter means to prepare said control system to change control states.

14. An electronic condition control system as described in claim 13 wherein said anticipation cycle counter means includes a plurality of counting stages connected to provide for counting of digital signals from said input gate means, and which stages include reset gate means to restore said counter means to its initial state upon receipt of a reset signal.

15. An electronic condition control system as described in claim 14 wherein said digital logic means includes an Exclusive-OR gate, and said further digital logic means includes a plurality of gate means forming a pair of generally parallel but reciprocally controlled signal processing paths.

16. An electronic condition control system as described in claim 15 wherein said first frequency signal is in the order of one hertz and said relatively high frequency signal is at least in the order of a magnitude higher than said first frequency signal.

17. An electronic condition control system as described in claim 15 wherein said relatively high frequency signal is in the order of 256 hertz.

* * * * *